UNITED STATES PATENT OFFICE.

BENJAMIN C. SENTON, OF RUTLAND, VERMONT, ASSIGNOR TO SENTON AND EVANS, OF NEW YORK, N. Y., A COPARTNERSHIP.

COMPOSITION OF MATTER.

No. 809,472.  Specification of Letters Patent.  Patented Jan. 9, 1906.

Application filed April 6, 1904. Serial No. 201,838.

*To all whom it may concern:*

Be it known that I, BENJAMIN C. SENTON, a citizen of the United States, residing at Rutland, in the county of Rutland and State of Vermont, have invented a new and useful Composition of Matter, of which the following is a specification.

My invention relates to a new composition or alloy of certain elements which has many new and useful properties and which may be used to great advantage in many ways, some of which will be pointed out in the following specification.

I have discovered that by combining the elements of tin, zinc, and aluminium with chlorid of sodium in certain proportions a new composition is formed which has many new and valuable properties. In making a compound according to my invention I employ the above elements fused together. These ingredients are preferably employed in the following proportions: twelve parts of tin, two parts of zinc, and one part of aluminium. One per cent. of chlorid of sodium is added to this alloy. By varying these proportions somewhat the composition formed by them may be made harder or softer at will, according to the various uses to which it is to be put. I sometimes add also a small amount of metallic antimony, which increases its hardness without materially changing the nature or the other characteristics of the composition itself.

The new composition of matter which may be thus obtained is an alloy of pure white color, which is capable of receiving a very high polish, and which will not tarnish nor lose its color. It may be molded, welded, and worked in many ways. One of the valuable uses to which it may be put is that of a solder. It will adhere strongly to many metals, to glass, and to other substances without the use of any flux whatever and without any special preparation of the surfaces to which it is to be applied. It may be readily applied by an ordinary soldering-copper, commonly called a "soldering-iron;" but the use of copper for this purpose is not necessary.

I have found that this composition is particularly adaptable for soldering aluminium, as it adheres to it strongly and is as readily applied to it as it is to other substances, such as copper and tin. As a solder it is highly sanitary, as it contains no lead. Neither are any acids used as a flux or for cleaning the surfaces to which it is applied. Its tensile strength is great, so that a soldered joint made with it is often stronger than the metal to which it is applied. Bars and wires of aluminium, as well as other substances, may be welded together by using it as a fluxing agent. Its high conductivity and the fact that it is not subject to electrolytic disturbances make it of value in soldering or welding electrical conductors of copper or aluminium or other suitable material. The sodium chlorid gives the alloy a brighter and clearer appearance and makes it less granular. It also makes it run more freely, so that it may be readily cast or molded, and it increases its adhesive power, so that it is more adaptable for plating purposes and for soldering.

While I have above set forth some of the uses of my new composition, I do not limit myself to such uses, as they are merely examples of some of its valuable characteristics. I have laid particular stress upon its use as a solder of aluminium, as I believe I am the first to discover a composition which can be successfully used for this purpose without the use of any flux or without any previous preparation of the surface to which it is to be applied.

What I claim as new, and desire to cover by Letters Patent, is—

A composition of matter comprising tin, zinc and aluminium with chlorid of sodium in substantially the following proportions: twelve parts of tin, two parts of zinc, one part of aluminium and one per cent. of chlorid of sodium.

BENJ. C. SENTON.

Witnesses:
 HENRY F. FIELD,
 CARL S. COLE.